United States Patent
Kou et al.

(10) Patent No.: US 9,790,452 B2
(45) Date of Patent: Oct. 17, 2017

(54) BLOCK COPOLYMERS AS SOIL RELEASE AGENTS IN LAUNDRY PROCESSES

(71) Applicants: BASF SE, Ludwigshafen (DE); HENKEL AG & Co. KGaA, Düsseldorf (DE)

(72) Inventors: Huiguang Kou, Viernheim (DE); Frank Pirrung, Grünstadt (DE); Roland Ettl, Altlußheim (DE); Bernhard Ulrich von Vacano, Mannheim (DE); Dario Perera-Diez, Basel (DE); Paula Barreleiro, Düsseldorf (DE); Christa Junkes, Düsseldorf (DE); Johannes Zipfel, Düsseldorf (DE); Brigitte Giesen, Düsseldorf (DE); Cornelius Bessler, Düsseldorf (DE); Martina Hutmacher, Düsseldorf (DE)

(73) Assignees: BASF SE, Ludwigshafen (DE); Henkel AG & Co. KGAA, Duesseldorf (DE)

( * ) Notice: Subject to any disclaimer, the term of this patent is extended or adjusted under 35 U.S.C. 154(b) by 0 days.

(21) Appl. No.: 14/780,045

(22) PCT Filed: Mar. 17, 2014

(86) PCT No.: PCT/EP2014/055226
§ 371 (c)(1),
(2) Date: Sep. 25, 2015

(87) PCT Pub. No.: WO2014/154508
PCT Pub. Date: Oct. 2, 2014

(65) Prior Publication Data
US 2016/0032224 A1  Feb. 4, 2016

(30) Foreign Application Priority Data
Mar. 27, 2013 (EP) .................... 13161408

(51) Int. Cl.
C08F 293/00 (2006.01)
C11D 3/37 (2006.01)
C11D 3/00 (2006.01)

(52) U.S. Cl.
CPC ........ *C11D 3/3769* (2013.01); *C08F 293/005* (2013.01); *C11D 3/0036* (2013.01); *C08F 2438/02* (2013.01)

(58) Field of Classification Search
CPC  C08F 293/00; C08F 293/005; C08F 2438/02; C08F 8/30; C08F 8/44; C11D 3/0036; C11D 3/3769
See application file for complete search history.

(56) References Cited

U.S. PATENT DOCUMENTS

| | | |
|---|---|---|
| 4,581,429 A | 4/1986 | Solomon et al. |
| 5,322,912 A | 6/1994 | Georges et al. |
| 5,928,382 A | 7/1999 | Reinhardt et al. |
| 5,942,152 A | 8/1999 | Tafesh et al. |
| 5,998,645 A | 12/1999 | Nestler |
| 6,235,695 B1 | 5/2001 | Blum et al. |
| 6,242,405 B1 | 6/2001 | Lykke et al. |
| 6,255,448 B1 | 7/2001 | Grimaldi et al. |
| 6,452,053 B2 | 9/2002 | Fischer et al. |
| 6,476,996 B1 | 11/2002 | Ryan |
| 6,479,450 B1 | 11/2002 | Weiss et al. |
| 6,602,441 B1 | 8/2003 | Nestler |
| 6,855,840 B2 | 2/2005 | McCormick et al. |
| 6,875,734 B2 | 4/2005 | Reinhardt et al. |
| 7,094,745 B2 | 8/2006 | Jonas et al. |
| 7,133,765 B2 | 11/2006 | Beyer et al. |
| 7,205,267 B2 | 4/2007 | Reinhardt et al. |
| 8,318,650 B2 | 11/2012 | Hatzelt et al. |
| 8,318,651 B2 | 11/2012 | Hatzelt et al. |
| 8,361,951 B2 | 1/2013 | Hatzelt et al. |
| 2001/0044401 A1 | 11/2001 | Perkins et al. |
| 2003/0060388 A1 | 3/2003 | Aoyagi et al. |
| 2004/0204556 A1 | 10/2004 | Matyjaszewski et al. |
| 2009/0151235 A1 | 6/2009 | Scanlon et al. |

FOREIGN PATENT DOCUMENTS

| | | |
|---|---|---|
| DE | 19639603 | 4/1998 |
| DE | 102004003710 | 8/2005 |
| DE | 102007017654 | 10/2008 |
| DE | 102007017656 | 10/2008 |
| DE | 102007017657 | 10/2008 |
| EP | 0458397 | 3/1997 |
| EP | 0761809 | 3/1997 |
| EP | 0783035 | 7/1997 |
| EP | 0877078 | 11/1998 |
| EP | 1038946 | 9/2000 |

(Continued)

OTHER PUBLICATIONS

PCT International Preliminary Report on Patentability in PCT/EP2014/055226, dated Sep. 29, 2015, 7 pages.
PCT International Search Report and Written Opinion in PCT/EP2014/055226, dated May 21, 2014, 10 pages.

*Primary Examiner* — Irina S Zemel
*Assistant Examiner* — Jeffrey Lenihan
(74) *Attorney, Agent, or Firm* — Servilla Whitney LLC

(57) ABSTRACT

Described are block copolymers which have been prepared by controlled free radical polymerization. Also described is the use of said block copolymers as soil release agents in laundry processes and a process to produce said block copolymers. Further described is a method for easier releasing soil from textiles in laundry processes and a detergent containing said block copolymers.

15 Claims, No Drawings

(56) References Cited

FOREIGN PATENT DOCUMENTS

| | | |
|---|---|---|
| EP | 621878 | 1/2001 |
| EP | 0900264 | 7/2001 |
| EP | 0805794 | 9/2001 |
| EP | 1148117 | 10/2001 |
| EP | 0912690 | 12/2001 |
| EP | 1174491 | 1/2002 |
| EP | 0918840 | 10/2002 |
| EP | 0923635 | 2/2003 |
| EP | 1083730 | 7/2003 |
| EP | 1001009 | 9/2003 |
| EP | 1445305 | 8/2004 |
| EP | 832969 | 11/2004 |
| EP | 0869171 | 11/2004 |
| EP | 0909809 | 11/2004 |
| EP | 1520910 | 4/2005 |
| EP | 1194514 | 1/2006 |
| EP | 1383857 | 5/2006 |
| GB | 2335190 | 9/1999 |
| GB | 2361235 | 10/2001 |
| WO | WO-96/06154 | 2/1996 |
| WO | WO-96/24620 | 8/1996 |
| WO | WO-97/07192 | 2/1997 |
| WO | WO-98/13392 | 4/1998 |
| WO | WO-98/30601 | 7/1998 |
| WO | WO-98/44008 | 10/1998 |
| WO | WO-99/03894 | 1/1999 |
| WO | WO-99/33947 | 7/1999 |
| WO | WO-99/65905 | 12/1999 |
| WO | WO-99/67298 | 12/1999 |
| WO | WO-00/07981 | 2/2000 |
| WO | WO-00/32731 | 6/2000 |
| WO | WO-00/60045 | 10/2000 |
| WO | WO-01/64826 | 9/2001 |
| WO | WO-01/85717 | 11/2001 |
| WO | WO-02/02865 | 1/2002 |
| WO | WO-02/48109 | 6/2002 |
| WO | WO-02/48205 | 6/2002 |
| WO | WO-02/48301 | 6/2002 |
| WO | WO-02/077145 | 10/2002 |
| WO | WO-02/100831 | 12/2002 |
| WO | WO-03/054128 | 7/2003 |
| WO | WO-2004/005688 | 1/2004 |
| WO | WO-2004/007657 | 1/2004 |
| WO | WO-2006/074969 | 7/2006 |
| WO | WO 2008/006723 | 1/2008 |
| WO | WO-2012/000992 | 1/2012 |
| WO | WO-2013/060708 | 5/2013 |

BLOCK COPOLYMERS AS SOIL RELEASE AGENTS IN LAUNDRY PROCESSES

CROSS-REFERENCE TO RELATED APPLICATIONS

This is application is the National Stage Entry of PCT/EP2014/055226, filed Mar. 17, 2014, which claims priority to European Patent Application No. 13161408.3, filed Mar. 27, 2013, the disclosures of which are incorporated herein by reference in their entireties.

TECHNICAL FIELD

The present invention relates to block copolymers which have been prepared by controlled free radical polymerization, the use of said block copolymers as soil release agents in laundry processes and a process to produce said block copolymers. Further aspects of the invention are a method for easier releasing soil from textiles in laundry processes and detergent containing said block copolymers.

BACKGROUND

In customary household washing methods, the problem exists that some types of soil and dirt are difficult to remove from textiles when using suboptimal detergent formulations and/or low wash temperatures, because these soils and dirt are strongly attached to the fiber surface or are strongly absorbed inside the fibers.

The use of several agents as soil release agents in laundry processes is known. Examples are carboxymethyl cellulose or anionic derivatives of polymers from terephthalic acid and polyethylene glycol (see e.g. E. Smulders in "Laundry Detergents" Wiley-VCH Verlag GmbH, 2002, page 88). Regarding soil release agents it is often assumed that these are deposited and accumulated on the fiber surface during laundry washing, thereby modifying the surface properties of the fibers. Soil and dirt that is subsequently deposited onto this modified fiber surface is easier released in a subsequent washing cycle. In PCT/EP2012/071020 (not published yet) the use of one or more comb or block copolymers as soil antiredeposition agents and soil release agents in aqueous laundry processes has been described.

There is a need to provide block copolymers for use as soil release agents in laundry processes. Additionally, there is a need to provide liquid and powder detergent compositions suitable for that use.

SUMMARY

A first aspect of the present invention is directed to a block copolymer obtained by a process comprising the steps of: a) polymerizing a $C_1$-$C_{10}$ alkyl ester of acrylic or methacrylic acid with controlled free radical polymerization; b) polymerizing the polymer of step a) with controlled free radical polymerization with (i) one or more monomers according to the following formula (I):

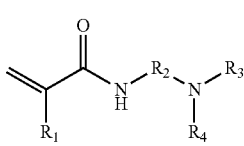

(I)

wherein $R_1$ is hydrogen or $C_{1-10}$ alkyl, $R_2$ is $C_{1-20}$ alkylene, and $R_3$ and $R_4$ are independently linear or branched $C_1$-$C_{22}$ alkyl; or (ii) one or more monomers according to the following formula (II):

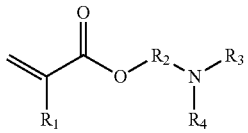

(II)

wherein $R_1$, is hydrogen or $C_{1-10}$ alkyl, $R_2$ is $C_{1-20}$ alkylene, and $R_3$ and $R_4$ are independently linear or branched $C_1$-$C_{22}$ alkyl; or (iii) a mixture of monomers according to formula (I) and (II); and (iv) optionally, with styrene or 4-Vinylpyridine, to form a block copolymer; c) modifying the block copolymer of step b) in a polymer analogous transesterification reaction with a primary or secondary alcohol; and d) optionally, quaternizing of the block copolymer of step c).

A second aspect of the present invention is directed to a block copolymer. In a second embodiment, a block copolymer is obtained by a process comprising the steps of: a) polymerizing a MPEG acrylate, siloxane acrylate, siloxane methacrylate, fluorinated acrylate, fluorinated methacrylate, C16/C18 alkyl acrylate with controlled free radical polymerization; b) polymerizing the polymer of step a) with controlled free radical polymerization with (i) one or more monomers according to the following formula (I):

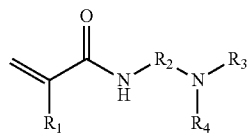

(I)

wherein $R_1$ is hydrogen or $C_{1-10}$ alkyl, $R_2$ is $C_{1-20}$ alkyl, and $R_3$ and $R_4$ are independently linear or branched $C_1$-$C_{22}$ alkyl; or (ii) one or more monomers according to the following formula (II):

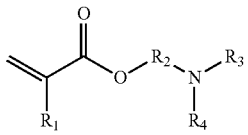

(II)

wherein $R_1$ is hydrogen or $C_{1-10}$ alkyl, $R_2$ is $C_{1-20}$ alkyl, and $R_3$ and $R_4$ are independently linear or branched $C_1$-$C_{22}$ alkyl; or (iii) a mixture of monomers according to formula (I) and (II); and (iv) optionally, with styrene or 4-vinylpyridine, to form a block copolymer; and c) optionally, quaternizing of the block copolymer of step b).

In a third embodiment, the block copolymer of the first and second embodiments is modified, wherein the block copolymer has a quaternization degree of 0 to 99%.

In a fourth embodiment, the block copolymer of the first through third embodiments is modified, wherein styrene or 4-vinylpyridine are present in the range of from 0 to 20 repeating units.

In a fifth embodiment, the block copolymer of the first through fourth embodiment is modified, wherein the block copolymer has a polydispersity index PDI from 1.0 to 2.5.

In a sixth embodiment, the block copolymer of the first and third through fifth embodiments is modified, wherein the block copolymer has been prepared in step a) from n-butylacrylate.

In a seventh embodiment, the block copolymer of the first through sixth embodiments is modified, wherein the monomer of step b) is selected from the group consisting of dimethylaminopropyl methacrylate, dimethylaminopropyl acrylate, 2-(dimethylamino)ethyl methacrylate, 2-(dimethylamino)ethyl acrylate, dimethylaminopropyl acrylamide, dimethylaminopropyl methacrylamide, 2-(dimethylamino) ethyl acrylamide, and 2-(dimethylamino)ethyl methacrylamide.

In an eighth embodiment, the block copolymer of the first and third through seventh embodiments is modified, wherein the monomer of step a) is n-butylacrylate and wherein the monomer of step b) is 2-(dimethylamino)ethyl methacrylate or dimethylaminopropyl methacrylamide.

In a ninth embodiment, the block copolymer of the first and third through eighth embodiments is modified, wherein the primary or secondary alcohol in step c) is selected from the group consisting of: a) an ethoxylate of formula (A)

wherein $R_A$ is saturated or unsaturated, linear or branched chain alkyl with 1 to 22 carbon atoms, or alkylaryl or dialkylaryl with up to 24 carbon atoms, and n is 1 to 150; b) a polydimethylsilicone oligomer of formula (B)

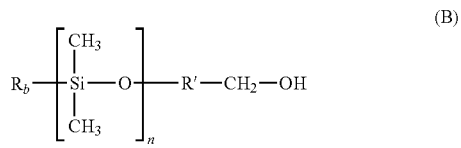

wherein $R_B$ is $C_1$-$C_{18}$ alkyl, phenyl or $C_7$-$C_{15}$ aralkyl; n is 1 to 50 and R' is a linking group with 1 to 20 carbon atoms; c) a partly or fully fluorinated primary alcohol; and d) a $C_8$ to $C_{60}$ alkyl linear or branched primary or secondary alcohol.

In a tenth embodiment, the block copolymer of the ninth embodiments is modified, wherein the primary or secondary alcohol is methoxy poly(ethylene glycol).

A further aspect of the present invention is directed to a process as defined in any one of the first through tenth embodiments. In an eleventh embodiment, a process for preparing a block copolymer comprises the steps of: a) polymerizing a $C_1$-$C_{10}$ alkyl ester of acrylic or methacrylic acid with controlled free radical polymerization; b) polymerizing the polymer of step a) with controlled free radical polymerization with (i) one or more monomers according to the following formula (I):

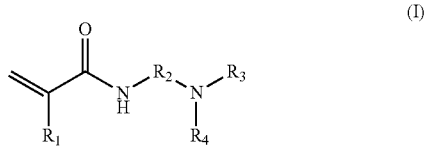

wherein $R_1$ is hydrogen or $C_{1-10}$ alkyl, $R_2$ is $C_{1-20}$ alkylene, and $R_3$ and $R_4$ are independently linear or branched $C_1$-$C_{22}$ alkyl; or (ii) one or more monomers according to the following formula (II):

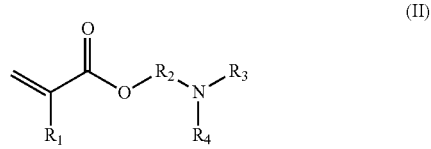

wherein $R_1$ is hydrogen or $C_{1-10}$ alkyl, $R_2$ is $C_{1-20}$ alkylene, and $R_3$ and $R_4$ are independently linear or branched $C_1$-$C_{22}$ alkyl; or (iii) a mixture of monomers according to formula (I) and (II); and (iv) optionally, with styrene or 4-vinylpyridine, to form a block copolymer; c) modifying the block copolymer of step b) in a polymer analogous transesterification reaction with a primary or secondary alcohol; and d) optionally, quaternizing of the block copolymer of step c).

An additional aspect of the present invention is directed to use of the block copolymer of the first through tenth embodiments as a soil release agent in aqueous laundry processes. In a twelfth embodiment, a soil release agent in an aqueous laundry process, comprises the block copolymer of any of the first through tenth embodiments.

Another aspect of the present invention is directed to a detergent composition. In a thirteenth embodiments, a detergent comprises the block copolymer any of the first through tenth embodiments.

DETAILED DESCRIPTION

In one or more embodiments, block copolymers obtainable by controlled free radical polymerization, analogous transesterification of the block copolymer and optionally quaternization of the obtained block copolymer are described.

Embodiments of a first aspect of the present invention are directed to a block copolymer obtainable by a process comprising the steps of a) polymerizing a $C_1$-$C_{10}$ alkyl ester of acrylic or methacrylic acid with controlled free radical polymerization;

b) polymerizing the polymer of step a) with controlled free radical polymerization with
 (i) one or more monomers according to the following formula (I):

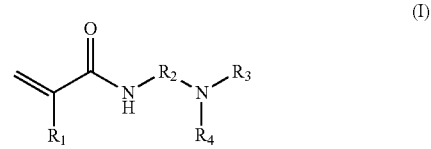

wherein $R_1$ is hydrogen or $C_{1-10}$ alkyl, $R_2$ is $C_{1-20}$ alkyl and $R_3$ and $R_4$ are independently linear or branched $C_1$-$C_{22}$ alkyl; or (ii) one or more monomers according to the following formula (II):

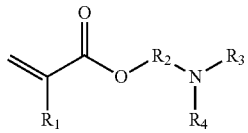

(II)

wherein $R_1$ is hydrogen or $C_{1-10}$ alkyl, $R_2$ is $C_{1-20}$ alkyl and $R_3$ and $R_4$ are independently linear or branched $C_1$-$C_{22}$ alkyl; or (iii) a mixture of monomers according to formula (I) and (II);

(iv) and optionally with styrene or 4-Vinylpyridine to form a block copolymer;

c) modifying the block copolymer of step b) in a polymer analogous transesterification reaction with a primary or secondary alcohol;

d) optionally quaternizing the block copolymer of step c).

Any controlled free radical polymerization known in the art can be used to prepare the block copolymers of the present invention. Examples for controlled free radical polymerizations are atom transfer radical polymerization (see US 2004/0204556), nitroxide-mediated radical polymerization (see WO2006/0074969) or reversible addition-fragmentation chain transfer polymerization (see U.S. Pat. No. 6,855,840).

It has been found that the controlled free radical polymerisation (CFRP) is a tool for the preparation of block copolymers according to the present invention. The combination of CFRP with subsequent post-modification of the stabilizing block allows enlarging the possible groups that can be used in the above mentioned detergent applications. With one CFRP-process a large row of different polymer materials becomes available. Block and comb copolymers prepared in such a two step reaction are, for example, described in WO 2006/0074969.

Controlled free radical polymerization using alkoxyamines or stable nitroxyl radicals is a well known technique and has been described extensively in the last twenty years.

For example U.S. Pat. No. 4,581,429 discloses a free radical polymerization process which controls the growth of polymer chains to produce short chain or oligomeric homopolymers and copolymers.

The process employs an initiator having the formula (in part) R'R"N—O—X, where X is a free radical species capable of polymerizing unsaturated monomers and the radical R'R"N—O. is terminating the growing oligomer/polymer.

U.S. Pat. No. 5,322,912 discloses a polymerization process using a free radical initiator, a polymerizable monomer compound and a stable free radical agent of the basic structure R'R"N—O. for the synthesis of homopolymers and block copolymers which are terminated by the nitroxyl radical.

More recently further nitroxyl radicals and nitroxyl ethers have been described. WO 98/13392 for example describes open chain alkoxyamine compounds, which have a symmetrical substitution pattern and are derived from NO gas or from nitroso compounds.

WO 96/24620 describes a polymerization process in which very specific stable free radical agents are used, such as for example

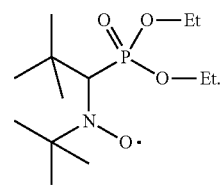

WO 98/30601 discloses specific nitroxyls based on imidazolidinons.

WO 98/44008 discloses specific nitroxyls based on morpholinones, piperazinones and piperazindiones.

These prior art nitroxyl radicals and nitroxyl ethers are all suitable for the instant invention.

Thus, in a specific embodiment, nitroxyl radicals and nitroxyl ethers are used in the process to prepare the block copolymers according to the present invention.

The nitroxylethers and nitroxyl radicals suitable for the invention are principally known from U.S. Pat. No. 4,581,429 or EP-A-621 878. Particularly useful are the open chain compounds described in WO 98/13392, WO 99/03894 and WO 00/07981, the piperidine derivatives described in WO 99/67298, GB 2335190 and GB 2 361 235 or the heterocyclic compounds described in GB 2342649 and WO 96/24620. Recently further nitroxyl radicals and nitroxyl ethers have been described in WO 02/48205, WO02/48109 and WO 02/100831.

Also suitable are the compounds described by Hawker et al, Chem. Commun., 2001, 823-824 Some compounds are commercially available or can be prepared according to the aforementioned documents.

For example, the structural element of the alkoxyamine,

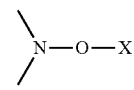

is a structural element of formula (III) and the structural element of the stable nitroxyl radical,

is a structural element of formula (IV)

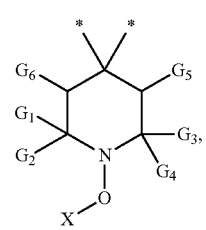

(III)

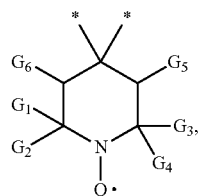

(IV)

wherein $G_1$, $G_2$, $G_3$, $G_4$ are independently $C_1$-$C_6$ alkyl or $G_1$ and $G_2$ or $G_3$ and $G_4$, or $G_1$ and $G_2$ and $G_3$ and $G_4$ together form a $C_5$-$C_{12}$ cycloalkyl group;

$G_5$, $G_6$ independently are H, $C_1$-$C_{18}$ alkyl, phenyl, naphthyl or a group COO$C_1$-$C_{18}$ alkyl;

X is selected from the group consisting of —CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

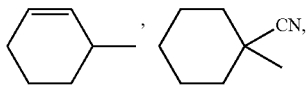

—CH$_2$CH=CH$_2$, CH$_3$CH—CH=CH$_2$ (C$_1$-C$_4$alkyl)CR$_{20}$—C(O)-phenyl, (C$_1$-C$_4$)alkyl-CR$_{20}$—C(O)—(C$_1$-C$_4$)alkoxy, (C$_1$-C$_4$)alkyl-CR$_{20}$—C(O)—(C$_1$-C$_4$)alkyl, (C$_1$-C$_4$)alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl, (C$_1$-C$_4$)alkyl-CR$_{20}$—C(O)—NH$_2$, wherein R$_{20}$ is hydrogen or (C$_1$-C$_4$)alkyl and * denotes a valence.

In a very specific embodiment of the present invention the alkoxyamine used for the controlled free radical polymerization is a compound of formula NOR01.

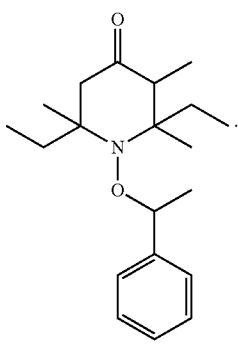

(NOR01)

In one or more embodiments, the alkoxyamine compound is used in an amount from 0.01 mol-% to 30 mol-%, more specifically in an amount of from 0.1 mol-% to 20 mol-% and most specifically in an amount of from 0.1 mol-% to 10 mol-% based on the monomer.

Because CFRP is a "living" polymerization, it can be started and stopped practically at will. Furthermore, the polymer product retains the functional alkoxyamine group allowing a continuation of the polymerization in a living matter. Thus, once the first monomer is consumed in the initial polymerizing step a second monomer can then be added to form a second block on the growing polymer chain in a second polymerization step. Therefore it is possible to carry out additional polymerizations with the same or different monomer(s) to prepare multi-block copolymers.

Furthermore, since this is a radical polymerization, blocks can be prepared in essentially any order. One is not necessarily restricted to preparing block copolymers where the sequential polymerizing steps must flow from the least stabilized polymer intermediate to the most stabilized polymer intermediate, such as is the case in ionic polymerization. Thus, it is possible to prepare a multi-block copolymer in which a polyacrylonitrile or a poly(meth)acrylate block is prepared first and then a styrene block is attached thereto.

Furthermore, there is no linking group required for joining the different blocks of the present block copolymer. One can simply add successive monomers to form successive blocks. The blocks might be separated by a tapered zone, in which monomers of both the previous and continued block are present in different ratios.

A plurality of specifically designed polymers and copolymers are accessible such as star and graft (co)polymers as described, inter alia, by C. J. Hawker in Angew. Chemie, 1995, 107, pages 1623-1627, dendrimers as described by K. Matyaszewski et al. in Macromolecules 1996, Vol 29, No. 12, pages 4167-4171, graft (co)polymers as described by C. J. Hawker et al. in Macromol. Chem. Phys. 198, 155-166 (1997), random copolymers as described by C. J. Hawker in Macromolecules 1996, 29, 2686-2688, or diblock and triblock copolymers as described by N. A. Listigovers in Macromolecules 1996, 29, 8992-8993.

The block copolymer of the present invention may be prepared by using different combinations of monomers.

In a specific embodiment, the block copolymer has been prepared in step a) from n-butylacrylate.

In a specific embodiment, the block copolymer has been prepared in step a) from a $C_1$-$C_{10}$ alkyl ester of acrylic or methacrylic acid, specifically n-butylacrylate, and from one or more monomers according to the following formula (I) in step b):

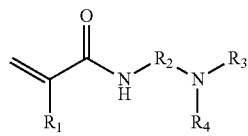

(I)

wherein $R_1$ is hydrogen or $C_{1-10}$ alkyl, $R_2$ is $C_{1-20}$ alkyl and $R_3$ and $R_4$ are independently linear or branched $C_1$-$C_{22}$ alkyl and optionally with styrene or 4-Vinylpyridine. In a more specific embodiment, $R_1$ is hydrogen or methyl, $R_2$ is $C_{1-3}$ alkyl and $R_3$ and $R_4$ are independently linear or branched $C_1$-$C_{22}$ alkyl and optionally and optionally with styrene or 4-Vinylpyridine.

In another specific embodiment, the block copolymer has been prepared in step a) from a $C_1$-$C_{10}$ alkyl ester of acrylic or methacrylic acid, specifically n-butylacrylate, and from one or more monomers according to the following formula (II) in step b):

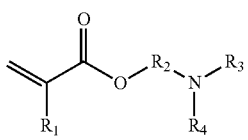

(II)

wherein $R_1$ is hydrogen or $C_{1-10}$ alkyl, $R_2$ is $C_{1-20}$ alkyl and $R_3$ and $R_4$ are independently linear or branched $C_1$-$C_{22}$ alkyl and optionally with styrene or 4-Vinylpyridine. In a more specific embodiment, $R_1$ is hydrogen or methyl, $R_2$ is $C_{1-3}$ alkyl and $R_3$ and $R_4$ are independently linear or branched $C_1$-$C_{22}$ alkyl and optionally with styrene or 4-Vinylpyridine.

Another specific embodiment is the block copolymer that has been prepared in step a) from a $C_1$-$C_{10}$ alkyl ester of acrylic or methacrylic acid, specifically n-butylacrylate, and from a mixture of monomers according to formula (I) and (II) in step b) and optionally with styrene or 4-Vinylpyridine.

In a further specific embodiment, the monomer of step b) to be polymerized with polymers of a $C_1$-$C_{10}$ alkyl ester of acrylic or methacrylic acid, specifically n-butylacrylate, prepared in step a) is preferably selected from the group consisting of dialkylaminopropyl methacrylate, dialkylaminopropyl acrylate, 2-(dialkylamino)ethyl methacrylate, 2-(dialkylamino)ethyl acrylate, dialkylaminopropyl methacrylamide, dialkylaminopropyl acrylamide, 2-(dialkylamino)ethyl acrylamide and 2-(dialkylamino)ethyl methacrylamide.

In another specific embodiment, the monomer of step b) to be polymerized with polymers of a $C_1$-$C_{10}$ alkyl ester of acrylic or methacrylic acid, specifically n-butylacrylate, prepared in step a) is specifically selected from the group consisting of dimethylaminopropyl methacrylate, dimethylaminopropyl acrylate, 2-(dimethylamino)ethyl methacrylate, 2-(dimethylamino)ethyl acrylate, dimethylaminopropyl acrylamide, dimethylaminopropyl methacrylamide, 2-(dimethylamino)ethyl acrylamide and 2-(dimethylamino)ethyl methacrylamide.

In a more specific embodiment, the monomer of step a) is n-butylacrylate and wherein the monomer of step b) is 2-(dimethylamino)ethyl methacrylate or dimethylaminopropyl methacrylamide.

In a further specific embodiment, the monomer according to formula (I) in step b) is not 3-dimethylaminopropylmethylacrylamide.

In a further embodiment, optionally styrene or 4-Vinylpyridine is added to the monomers of step b), as defined above. In a specific embodiment, styrene or 4-Vinylpyridine is added to the monomers of step b), as defined above.

In a specific embodiment, the monomers of step a) are present in the range of from 10 to 200 repeating units, more specifically in the range of from 30 to 100 repeating units.

In another specific embodiment, the monomers of step b) in accordance with formula (I) and (II) as defined above are present in the range of from 1 to 100 repeating units, more specifically in the range of from 5 to 50 repeating units.

In a further specific embodiment, styrene or 4-Vinylpyridine are present in the range of from 0 to repeating units, more specifically in the range of from 1 to 20 repeating units or even more specifically in the range of from 1 to 10 repeating units.

The polydispersity (PDI) of a sample is defined as weight average molecular weight Mw divided by number average molecular weight Mn and gives an indication on how narrow a distribution is.

In a specific embodiment, the block copolymer of the present invention has a polydispersity, PDI from 1.0 to 2.5. More specifically, the block copolymer of the present invention has a PDI from 1.1 to 2.0.

In another specific embodiment, the block copolymer of the invention has amphiphilic properties.

When the controlled free radical polymerization is carried out with a nitroxyl radical an initiating radical source is additionally necessary for preparing the block copolymer of the invention. This radical source initiator is preferably an azo compound, a peroxide, perester or a hydroperoxide.

In one or more embodiments, specific radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}; acetyl cyclohexane sulphonyl peroxide, diisopropyl peroxy dicarbonate, tamyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis(t-butylperoxy) butane, 2,2 bis(t-butylperoxy) propane, dicumyl peroxide, 2,5-dimethylhexane-2,5-di-t-butylperoxide, 3-t-butylperoxy 3-phenylphthalide, di-t-amyl peroxide, α, α'-bis(t-butylperoxy isopropyl)benzene, 3,5-bis(t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

In one or more embodiments, the radical source is present in an amount of from 0.01 mol-% to 30 mol-%, more specifically in an amount of from 0.1 mol-% to 20 mol-% and most specifically in an amount of from 0.5 mol-% to 10 mol-% based on the monomer.

In a specific embodiment of the invention, the molar ratio of the radical source to the nitroxyl radical may be from 1:10 to 10:1, preferably from 1:5 to 5:1 and more specifically from 1:2 to 2:1.

The reaction conditions for the CFRP step a) are widely described in the documents listed above. In general the polymerization temperature is between 60 and 180° C. at normal pressure and the reaction time may vary from 30 minutes to 20 hours.

The reaction conditions for the CFRP step b) are widely described in the documents listed above. In general the polymerization temperature is between 60 and 180° C. at normal pressure and the reaction time may vary from 30 minutes to 20 hours.

In a specific embodiment, the primary or secondary alcohol to be used in the transesterification of step c) is an ethoxylate of formula (A)

$$R_4-[O-CH_2-CH_2-]_n-OH \quad (A)$$

wherein $R_4$ is saturated or unsaturated, linear or branched chain alkyl with 1-22 carbon atoms, or alkylaryl or dialkylaryl with up to 24 carbon atoms and n is 1 to 150;

a polydimethylsilicone oligomer of formula (B)

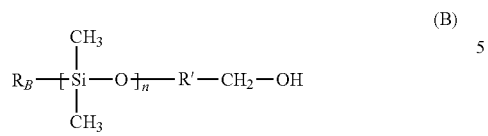

wherein $R_B$ is $C_1$-$C_{18}$alkyl, phenyl or $C_7$-$C_{15}$aralkyl; n is 1 to 50 and R' is a linking group with 1 to carbon atoms;
a partly or fully fluorinated primary alcohol; or
a $C_8$ to $C_{60}$alkyl linear or branched primary or secondary alcohol.

In the term alkylaryl, aryl means phenyl or naphthyl and alkyl is preferably $C_1$-$C_{20}$ linear or branched alkyl.

The term aralkyl means —($C_1$-$C_7$alkyl)-$C_6H_5$ or —($C_1$-$C_3$alkyl)-$C_{10}H_7$.

In a specific embodiment, the alcohol used in the process to prepare the block polymers of the present invention is a partly or fully fluorinated primary alcohol. Examples of commercial fluorinated alcohol mixtures are: Zonyl BA®, Zonyl BA-L®, Zonyl BA-LD®, Zonyl BA-N® from Du Pont or fluorinated polyoxetane alcohols from Omnova Solutions Inc.

In a more specific embodiment, the primary alcohol of step b) used in the process to prepare the block copolymer of the invention is an ethoxylate of formula (A):

wherein $R_A$ is saturated or unsaturated, linear or branched chain alkyl with 1-22 carbon atoms and n is 1 to 150.

In a most specific embodiment, the primary alcohol is methoxy polyethylene glycol.

In accordance with one or more embodiments, the block copolymers of the present invention described above can be quaternized in step d) by methods known in the art. Quaternization is carried out with cooking or without cooking (at room temperature) of the mixture comprising the block copolymer, the quaternization agent, and optionally solvent or water, as described e.g. in Macromolecules 1996, 29, 3416-3420. In a specific embodiment, the block copolymer has a quaternization degree of 0 to 99%. In a more specific embodiment, the block copolymer has a quaternization degree of 0 to 80%. In an even more specific embodiment, the block copolymer has a quaternization degree of 20 to 80%. In a most specific embodiment, the block copolymer has a quaternization degree of 20%, 50% or 80%. The quaternization degree can be determined via the reduction of amine number by titration. For instance, a quaternization degree of 20% means that the amine number is 20% reduced.

In a further embodiment, the block copolymer may be obtainable by using polyethylene glycol monoethylether (MPEG) acrylate, siloxane acrylate, siloxane methacrylate, fluorinated acrylate, fluorinated methacrylate, C16/C18 alkyl acrylate in step a) of the process and thereby no analogous transesterification will be required after step b).
Thus, another aspect of the invention is directed to a block copolymer obtainable by a process comprising the steps of
a) polymerizing a MPEG acrylate, siloxane acrylate, siloxane methacrylate, fluorinated acrylate, fluorinated methacrylate, C16/C18 alkyl acrylate with controlled free radical polymerization;
b) polymerizing the polymer of step a) with controlled free radical polymerization with (i) one or more monomers according to the following formula (I):

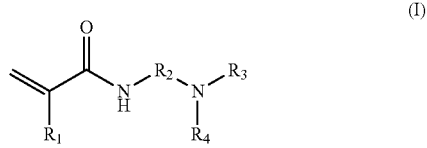

wherein $R_1$ is hydrogen or $C_{1-10}$ alkyl, $R_2$ is $C_{1-20}$ alkyl and $R_3$ and $R_4$ are independently linear or branched $C_1$-$C_{22}$ alkyl; or
(ii) one or more monomers according to the following formula (II):

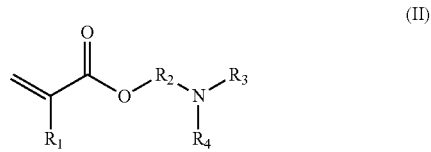

wherein $R_1$ is hydrogen or $C_{1-10}$ alkyl, $R_2$ is $C_{1-20}$ alkyl and $R_3$ and $R_4$ are independently linear or branched $C_1$-$C_{22}$ alkyl; or
(iii) a mixture of monomers according to formula (I) and (II);
(iv) and optionally with styrene or 4-Vinylpyridine,
to form a block copolymer;
c) optionally quaternizing of the block copolymer of step b).

The specific embodiments described above also apply to this block copolymer.

One other aspect of the present invention is directed to a process, as described above, for the preparation of the block copolymer of the present invention.

A further aspect of the invention relates to the use of the block copolymer of the present invention as soil release agent in aqueous laundry processes.

Typically the aqueous laundry process is a domestic laundry process.

For example the textile may be made from polyester, polyacrylate, cotton, wool, polyamide or mixtures thereof; preferably it is made from cotton.

Another aspect of the invention is directed to a method for soil release from textiles during an aqueous laundry process, which method comprises applying a block copolymer which is obtainable by, preferably which has been obtained by, a process comprising the steps of
a) polymerizing a $C_1$-$C_{10}$ alkyl ester of acrylic or methacrylic acid with controlled free radical polymerization;
b) polymerizing the polymer of step a) with controlled free radical polymerization with
(i) one or more monomers according to the following formula (I):

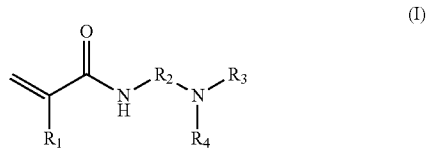

wherein $R_1$ is hydrogen or $C_{1-10}$ alkyl, $R_2$ is $C_{1-20}$ alkyl and $R_3$ and $R_4$ are independently linear or branched $C_1$-$C_{22}$ alkyl; or (ii) one or more monomers according to the following formula (II):

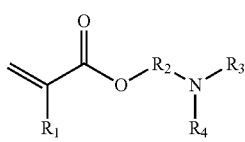

wherein $R_1$ is hydrogen or $C_{1-10}$ alkyl, $R_2$ is $C_{1-20}$ alkyl and $R_3$ and $R_4$ are independently linear or branched $C_1$-$C_{22}$ alkyl; or (iii) a mixture of monomers according to formula (I) and (II);

(iv) and optionally with styrene or 4-Vinylpyridine, to form a block copolymer;

c) modifying the block copolymer of step b) in a polymer analogous transesterification reaction with a primary or secondary alcohol; and d) optionally quaternizing of the block copolymer of step c).

In a further embodiment, a method for soil release from textiles during an aqueous laundry process can be a method which comprises applying a block copolymer which has been prepared by using MPEG acrylate, siloxane acrylate, siloxane methacrylate, fluorinated acrylate, fluorinated methacrylate, C16/C18 alkyl acrylate in step a) of the process and thereby no step c), i.e. an analogous transesterification will be required after step b.) When the block copolymer is used as part of a detergent it preferably is present in an amount of from 0.01% by weight to 5% by weight, based on the weight of the total detergent composition.

Also an aspect of the invention is a detergent comprising block copolymer according to the invention or a block copolymer which is obtainable by, preferably which has been obtained by, a process according to the invention, as disclosed above, in an amount of from 0.01% by weight to 5% by weight, preferably from 0.1% by weight to 2% by weight, based on the weight of the total detergent composition The detergent according to the invention can be, for example, a bleach-containing heavy-duty detergent, a detergent for delicate textiles, or a detergent for colored goods. It can be solid, such as a powder, granulate, or tablet, or liquid, such as a structured (i.e. turbid) or unstructured (i.e. clear) liquid detergent based on water and/or one or more of organic solvents.

The detergent will normally include at least one surfactant which may be anionic, cationic, nonionic or amphoteric.

The anionic surfactant can be, for example, a sulfate, sulfonate or carboxylate surfactant or a mixture thereof. Preference is given to alkylbenzenesulfonates, alkyl sulfates, alkyl ether sulfates, olefin sulfonates, fatty acid salts, alkyl and alkenyl ether carboxylates or to an α-sulfonic fatty acid salt or an ester thereof.

In one or more embodiments, sulfonates are, for example, alkylbenzenesulfonates having from 10 to 20 carbon atoms in the alkyl radical, alkyl sulfates having from 8 to 18 carbon atoms in the alkyl radical, alkyl ether sulfates having from 8 to 18 carbon atoms in the alkyl radical, and fatty acid salts derived from palm oil or tallow and having from 8 to 18 carbon atoms in the alkyl moiety. The average molar number of ethylene oxide units added to the alkyl ether sulfates is from 1 to 20, preferably from 1 to 10. The cation in the anionic surfactants is preferably an alkaline metal cation, especially sodium or potassium, more especially sodium. Specific carboxylates are alkali metal sarcosinates of formula $R_{19'}$—$CON(R_{20'})CH_2COOM_1$ wherein $R_{19'}$ is $C_9$-$C_{17}$alkyl or $C_9$-$C_{17}$alkenyl, $R_{20'}$ is $C_1$-$C_4$alkyl and $M_1$ is an alkali metal, especially sodium.

The non-ionic surfactant may be, for example, a primary or secondary alcohol ethoxylate, especially a $C_8$-$C_{20}$ aliphatic alcohol ethoxylated with an average of from 1 to 20 mol of ethylene oxide per alcohol group. In one or more embodiments, the non-ionic surfactant may be primary and secondary $C_{10}$-$C_{15}$ aliphatic alcohols ethoxylated with an average of from 1 to 10 mol of ethylene oxide per alcohol group. Non-ethoxylated non-ionic surfactants, for example alkylpolyglycosides, glycerol monoethers and polyhydroxyamides (glucamide), may likewise be used.

In addition to or instead of anionic and/or non-ionic surfactants, the composition may contain cationic surfactants. Possible cationic surfactants include all common cationic surface-active compounds, especially surfactants having a textile softening effect.

Non-limiting examples of cationic surfactants are given in the formulas below:

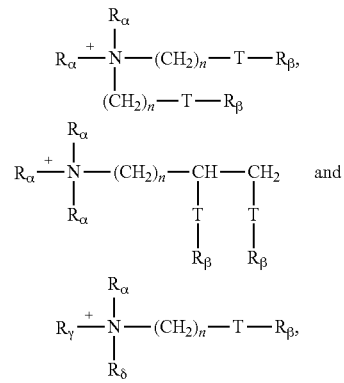

wherein
each radical $R_\alpha$ is independent of the others $C_{1-6}$-alkyl-, -alkenyl- or -hydroxyalkyl; each radical
$R_\beta$ is independent of the others $C_{8-28}$-alkyl- or alkenyl;
$R_\gamma$ is $R_\alpha$ or $(CH_2)_n$-T-$R_\beta$;
$R_\delta$ is $R_\alpha$ or $R_\beta$ or $(CH_2)_n$-T-$R_\beta$; T=—$CH_2$—, —O—CO— or —CO—O— and
n is between 0 and 5.

Specific cationic surfactants include hydroxyalkyl-trialkyl-ammonium-compounds, especially $C_{12-18}$alkyl(hydroxyethyl)dimethylammonium compounds, and specifically the corresponding chloride salts.

Detergents of the present invention may contain up to 15 wt-%, for example between 0.5 wt-% and 15 wt-% of the cationic surfactant, based on the total weight of the composition.

The total amount of surfactants is preferably from 1 to 50 wt-%, especially from 1 to 40 wt-% and more especially from 1 to 30 wt-% of the detergent.

As builder substance there come into consideration, for example, alkali metal phosphates, especially tripolyphosphates, carbonates and hydrogen carbonates, especially their sodium salts, silicates, aluminum silicates, polycarboxylates, polycarboxylic acids, organic phosphonates, aminoalkylenepoly(alkylenephosphonates) and mixtures of such compounds.

Silicates that are especially suitable are sodium salts of crystalline layered silicates of the formula $NaHSi_tO_{2t+1}\cdot pH_2O$ or $Na_2Si_tO_{2t+1}\cdot pH_2O$ wherein t is a number from 1.9 to 4 and p is a number from 0 to 20.

Among the aluminum silicates, preference is given to those commercially available under the names zeolite A, B, X and HS, and also to mixtures comprising two or more of such components. Special preference is given to zeolite A.

Among the polycarboxylates, preference is given to polyhydroxycarboxylates, especially citrates, and acrylates, and also to copolymers thereof with maleic anhydride. Specific polycarboxylic acids are nitrilotriacetic acid, ethylenediaminetetraacetic acid and ethylenediamine disuccinate either in racemic form or in the enantiomerically pure (S,S) form.

Phosphonates or aminoalkylenepoly(alkylenephosphonates) that are especially suitable are alkali metal salts of 1-hydroxyethane-1,1-diphosphonic acid, nitrilotris(methylenephosphonic acid), ethylenediaminetetramethylenephosphonic acid and diethylenetriaminepentamethylenephosphonic acid, and also salts thereof. Specific polyphosphonates have the following formula

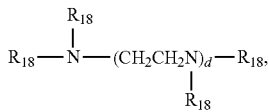

wherein $R_{18}$ is $CH_2PO_3H_2$ or a water soluble salt thereof and d is an integer of the value 0, 1, 2 or 3.

In one or more embodiments, the polyphosphonates wherein b is an integer of the value of 1 are used.

As bleach component, which may be a peroxide bleach, there come into consideration hydrogen peroxide and compounds capable of yielding hydrogen peroxide in aqueous solutions, for example, the organic and inorganic peroxides known in the literature and available commercially that may bleach textile materials at conventional washing temperatures, for example at a temperature in the range of from 10 to 95° C. In one or more embodiments, however, inorganic peroxides are used, for example persulfates, perborates, percarbonates and/or persilicates.

Peroxide bleach compounds may be utilized alone or in conjunction with a peroxyacid bleach precursor and/or a bleach catalyst. Peroxy acids precursors are often referred to as bleach activators. Suitable bleach activators include the bleach activators, that carry O- and/or N-acyl groups and/or unsubstituted or substituted benzoyl groups. Preference is given to polyacylated alkylenediamines, especially tetraacetylethylenediamine (TAED); acylated glycolurils, especially tetraacetyl glycol urea (TAGU), N,N-diacetyl-N,N-dimethylurea (DDU); sodium-4-benzoyloxy benzene sulphonate (SBOBS); sodium-1-methyl-2-benzoyloxy benzene-4-sulphonate; sodium-4-methyl-3-benzoloxy benzoate; trimethyl ammonium toluyloxy-benzene sulphonate; acylated triazine derivatives, especially 1,5-diacetyl-2,4-dioxohexahydro-1,3,5-triazine (DADHT); compounds of formula (6):

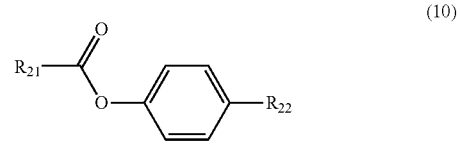

wherein $R_{22}$ is a sulfonate group, a carboxylic acid group or a carboxylate group, and wherein $R_{21}$ is linear or branched $(C_7-C_{15})$alkyl, especially activators known under the names SNOBS, SLOBS and DOBA; nitrile compounds that form perimine acids with peroxides also come into consideration as bleach activators. These bleach activators may be used in an amount of up to 12 wt-%, preferably from 2-10 wt-% based on the total weight of the composition.

It is also possible to use bleach catalysts, which are commonly known, for example transition metal complexes as disclosed in EP 1194514, EP 1383857 or WO04/007657.

Further bleach catalysts are disclosed in: US 2001044401, EP 0458397, WO 9606154, EP 1038946, EP 0900264, EP 0909809, EP 1001009, WO 9965905, WO 0248301, WO 0060045, WO 02077145, WO 0185717, WO 0164826, EP 0923635, DE 19639603, DE102007017654, DE102007017657, DE102007017656, US 20030060388, EP 0918840B1, EP 1174491A2, EP 0805794B1, WO 9707192A1, U.S. Pat. No. 6,235,695B1, EP 0912690B1, EP 832969B1, U.S. Pat. No. 6,479,450B1, WO 9933947A1, WO 0032731A1, WO 03054128A1, DE102004003710, EP 1083730, EP 1148117, EP 1445305, U.S. Pat. No. 6,476, 996, EP 0877078, EP 0869171, EP 0783035, EP 0761809 and EP 1520910. If desired a bleach catalyst may be combined with a peroxyacid bleach precursor.

In one or more embodiments, the detergent may comprise one or more optical brighteners, for example from the classes bis-triazinylamino-stilbenedisulfonic acid, bis-triazolylstilbenedisulfonic acid, bis-styryl-biphenyl or bis-benzofuranylbiphenyl, αbis-benzoxalyl derivative, bis-benzimidazolyl derivative or coumarin derivative or a pyrazoline derivative.

The compositions may furthermore comprise one or more further additives. Such additives are, for example, dirt-suspending agents, for example sodium carboxymethylcellulose; pH regulators, for example alkali metal or alkaline earth metal silicates; foam regulators, for example soap; salts for adjusting the spray drying and the granulating properties, for example sodium sulfate; perfumes; and also, if appropriate, antistatics and softening agents such as, for example, smectite; pigments; and/or toning agents. These constituents should especially be stable to any bleaching agent, if such is employed.

If such auxiliaries are used they normally are added in a total amount of from 0.1-20 wt-%, preferably from 0.5-10 wt-%, especially from 0.5-5 wt-%, based on the total weight of the detergent.

Furthermore, the detergent may optionally also comprise enzymes. Enzymes can be added for the purpose of stain removal. The enzymes usually improve the action on stains caused by protein or starch, such as, for example, blood, milk, grass or fruit juices. Specific enzymes are cellulases and proteases, especially proteases. Cellulases are enzymes that react with cellulose and its derivatives and hydrolyse them to form glucose, cellobiose and cellooligosaccharides. Cellulases remove dirt and, in addition, have the effect of enhancing the soft handle of the fabric.

Examples of customary enzymes include, but are by no means limited to, the following:

proteases as described in U.S. Pat. No. 6,242,405, column 14, lines 21 to 32;

lipases as described in U.S. Pat. No. 6,242,405, column 14, lines 33 to 46;

amylases as described in U.S. Pat. No. 6,242,405, column 14, lines 47 to 56; and cellulases as described in U.S. Pat. No. 6,242,405, column 14, lines 57 to 64;

Commercially available detergent proteases, such as Alcalase®, Esperase®, Everlase®, Savinase®, Kannase® and Durazym®, sold e.g. by NOVOZYMES A/S;

Commercially available detergent amylases, such as Termamyl®, Duramyl®, Stainzyme®, Natalase®, Ban® and Fungamyl®, sold e.g. by NOVOZYMES A/S;

Commercially available detergent ellulases, such as Celluzyme®, Carezyme® and Endolase®, sold e.g. by NOVOZYMES A/S;

Commercially available detergent lipases, such as Lipolase®, Lipolase Ultra® and Lipoprime®, sold e.g. by NOVOZYMES A/S;

Suitable mannanases, such as Mannanaway®, sold by NOVOZYMES A/S.

The enzymes, when used, may be present in a total amount of from 0.01 to 5 wt-%, especially from 0.05 to 5 wt-% and more especially from 0.1 to 4 wt-%, based on the total weight of the detergent.

Further ingredients in a detergent according to the invention are dye-fixing agents and/or polymers which, during the washing of textiles, prevent staining caused by dyes in the washing liquor that have been released from the textiles under the washing conditions. Such polymers are preferably polyvinylpyrrolidones, polyvinylimidazoles or polyvinylpyridine-N-oxides, which may have been modified by the incorporation of anionic or cationic substituents, especially those having a molecular weight in the range of from 5000 to 60 000, more especially from 10 000 to 50 000. If such polymers are used, they are usually used in a total amount of from 0.01 to 5 wt-%, especially from 0.05 to 5 wt-%, more especially from 0.1 to 2 wt-%, based on the total weight of the detergent formulation. Specific polymers are those mentioned in WO-A-02/02865 (see especially page 1, last paragraph and page 2, first paragraph) and those in WO-A-04/05688.

It is also possible to employ a block copolymer according to the invention or obtainable by a process according to the invention in combination with a conventional soil-release polymer obtainable from dicarboxylic acid and optionally polymeric diol, in order to further enhance the cleaning power of laundry detergents when washing fabrics. In the context of a dtergent according to the invention, such combinations are also possible. The known polyester soil-release polymers that can be additionally incorporated or used include copolyesters of dicarboxylic acids, for example adipic acid, phthalic acid, terephthalic acid or sulfoisophthalic acid, with diols, for example ethylene glycol or propylene glycol, and optionally polydiols, for example polyethylene glycol or polypropylene glycol.

The detergent according to the invention may also optionally contain one or more heavy metal chelating agents, such as hydroxyethyldiphosphonate (HEDP). More generally, chelating agents suitable for use herein can be selected from the group consisting of amino carboxylates, amino phosphonates, polyfunctionally-substituted aromatic chelating agents and mixtures thereof. Other suitable chelating agents for use herein are the commercial DEQUEST series, and chelants from Nalco, Inc. Aminocarboxylates useful as optional chelating agents include ethylenediaminetetracetates, N-hydroxyethylethylenediaminetriacetates, nitrilotriacetates, ethylenediamine tetraproprionates, triethylenetetraaminehexacetates, diethylenetriamine-pentaacetates, and ethanoldiglycines, alkali metal, ammonium, and substituted ammonium salts thereof and mixtures thereof. Aminophosphonates are also suitable for use as chelating agents in the compositions of the invention when at least low levels of total phosphorus are permitted in detergent compositions, and include ethylenediaminetetrakis (methylenephosphonates). Further biodegradable sequestrants are, for example, aminoacid acetates, such as Trilon M (BASF) and Dissolvine GL (AKZO), as well as asparaginic acid derivatives, such as Baypure CX. Preferably, the aminophosphonates do not contain alkyl or alkenyl groups with more than about 6 carbon atoms. A highly specific biodegradable chelator for use herein is ethylenediamine disuccinate ("EDDS"). If utilized, such chelating agents or transition-metal selective sequestrants will generally comprise from about 0.001 wt-% to about 10 wt-%, more specifically from about 0.05 wt-% to about 1 wt-% of the laundry detergent compositions herein.

A specific detergent according to the invention may additionally contain a dispersant polymer. When present, a dispersant polymer is typically at levels in the range from 0 wt-% to about 25 wt-%, specifically from about 0.5 wt-% to about 20 wt-%, more specifically from about 1 wt-% to about 8 wt-% of the detergent.

Suitable polymers are preferably at least partially neutralized or alkali metal, ammonium or substituted ammonium (e.g., mono-, di- or triethanolammonium) salts of polycarboxylic acids. The alkali metal, especially sodium salts are most specific. While the molecular weight of the polymer can vary over a wide range, in one or more embodiment it is from about 1,000 to about 500,000, more specifically is from about 1,000 to about 250,000.

Unsaturated monomeric acids that can be polymerized to form suitable dispersant polymers include acrylic acid, maleic acid (or maleic anhydride), fumaric acid, itaconic acid, aconitic acid, mesaconic acid, citraconic acid and methylenemalonic acid. The presence of monomeric segments containing no carboxylate radicals such as methyl vinyl ether, styrene, ethylene, etc. is suitable provided that such segments do not constitute more than about 50 wt-% of the dispersant polymer.

Copolymers of acrylamide and acrylate having a molecular weight of from about 3,000 to about 100,000, preferably from about 4,000 to about 20,000, and an acrylamide content of less than about 50 wt-%, preferably less than about 20 wt-% of the dispersant polymer can also be used. Most preferably, such dispersant polymer has a molecular weight of from about 4,000 to about 20,000 and an acrylamide content of from about 0 wt-% to about 15 wt-%, based on the total weight of the polymer.

In one or more embodiments, dispersant polymers used are low molecular weight modified polyacrylate copolymers. Such copolymers contain as monomer units: a) from about 90 wt-% to about 10 wt-%, specifically from about 80 wt-% to about 20 wt-% acrylic acid or its salts and b) from about 10 wt-% to about 90 wt-%, specifically from about 20 wt-% to about 80 wt-% of a substituted acrylic monomer or its salt and have the general formula: —[(C($R_a$,)C($R_b$,)(C(O)O$R_c$,)] wherein the apparently unfilled valencies are in fact occupied by hydrogen and at least one of the substituents $R_a$, $R_b$, or $R_c$, preferably $R_a$, or $R_b$, is a 1 to 4 carbon alkyl or hydroxyalkyl group; $R_a$, or $R_b$, can be a hydrogen and $R_{c'}$, can be a hydrogen or alkali metal salt. Most specific is a substituted acrylic monomer wherein $R_{a'}$ is methyl, $R_{b'}$ is hydrogen, and $R_{c'}$ is sodium.

A suitable low molecular weight polyacrylate dispersant polymer preferably has a molecular weight of less than about 15,000, preferably from about 500 to about 10,000, most preferably from about 1,000 to about 5,000. The most specific polyacrylate copolymer for use herein has a molecular weight of about 3,500 and is the fully neutralized form of the polymer comprising about 70 wt-% acrylic acid and about 30 wt-% methacrylic acid.

Other dispersant polymers useful herein include the polyethylene glycols and polypropylene glycols having a molecular weight of from about 950 to about 30,000.

Yet other dispersant polymers useful herein include the cellulose sulfate esters such as cellulose acetate sulfate, cellulose sulfate, hydroxyethyl cellulose sulfate, methylcellulose sulfate, and hydroxypropylcellulose sulfate. Sodium cellulose sulfate is the most specific polymer of this group.

Other suitable dispersant polymers are the carboxylated polysaccharides, particularly starches, celluloses and alginates.

Yet another group of acceptable dispersants are the organic dispersant polymers, such as polyaspartate.

Organic solvents that can be used in a detergent according to the invention, especially when the latter are in liquid or paste form, include alcohols having from 1 to 4 carbon atoms, especially methanol, ethanol, isopropanol and tert-butanol, diols having from 2 to 4 carbon atoms, especially ethylene glycol and propylene glycol, and mixtures thereof, and the ethers derivable from the mentioned classes of compound. In one or more embodiments, such water-miscible solvents are present in the cleaning formulations according to the invention in amounts not exceeding 20 wt-%, especially in amounts of from 1 wt-% to 15 wt-%.

The detergent formulations can take a variety of physical forms such as, for example, powder granules, tablets (tabs), gel and liquid. Examples thereof include, inter alia, conventional high-performance detergent powders, supercompact high-performance detergent powders, conventional heavy duty liquid detergents, highly concentrated gels and tabs.

The detergent may also be in the form of an aqueous liquid containing from 5 wt-% to 90 wt-%, specifically from 10 wt-% to 70 wt-%, of water, or in the form of a non-aqueous liquid containing no more than 5 wt-%, specifically from 0 wt-% to 1 wt-% of water. Non-aqueous liquid detergent formulations may comprise other solvents as carriers. Low molecular weight primary or secondary alcohols, for example methanol, ethanol, propanol and isopropanol, are suitable for that purpose. The solubilising surfactant used is preferably a monohydroxy alcohol but polyols, such as those containing from 2 to 6 carbon atoms and from 2 to 6 hydroxy groups (e.g., 1,3-propanediol, ethylene glycol, glycerol and 1,2-propanediol) can also be used. Such carriers are usually used in a total amount of from 5 wt-% to 90 wt-%, specifically from 10 wt-% to 50 wt-%, based on the total weight of the detergent formulation. The detergent formulations can also be used in so-called "unit liquid dose" form.

The definitions and preferences given above apply equally for all aspects of the invention.

The following examples illustrate the invention.

ABBREVIATIONS AND REAGENTS

GPC: gel permeation chromatography
PS-Standard: polystyrene standards for GPC calibration
mbar=millibar
THF: tetrahydrofurane
n-BA: n-butylacrylate
MPEG500 (poly ethylene glycol monomethylether with Mn of 500 g/mol, obtainable from the company Clariant)
MPEG1000 (poly ethylene glycol monomethylether with Mn of 1000 g/mol, obtainable from the company Clariant)
quat: quaternized
NOR 01: polymerization regulator, which is prepared according to GB 2335190.

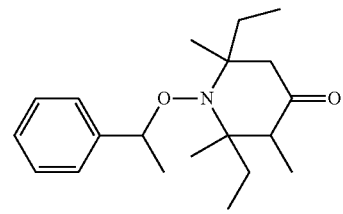

NOR 01

The transesterification proceeds at random. It should, however, be noted that the abbreviated names e.g. poly(n-BA-co-MPEG500A) of Example 1, do not mention the end groups on both sides of the polymer, i.e. the 1-phenyl-ethyl group and the NOR fragment.

The designation -co- in the abbreviated names indicates that the monomers formally constituting the polymer, in this example n-BA and MPEG500-acrylate, are present at random.

The designation -b-, as shown in example 1, of poly(n-BA-b-DMAPMA-co-STY), means that the polymer consists of two defined blocks, the first of n-BA monomer units and the second block of random copolymer of DMAPMA monomer units and STY means styrene.

EXAMPLES

A) Preparation of the Block Copolymers

Example A

Synthesis of a Linear Polymer Poly(n-BA)

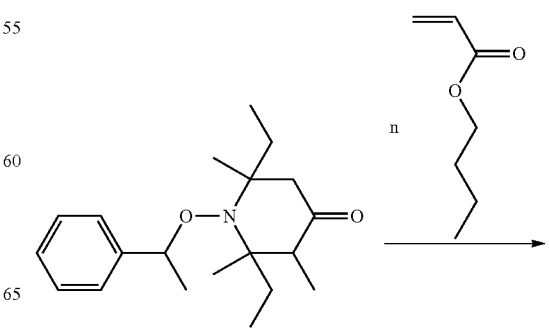

-continued

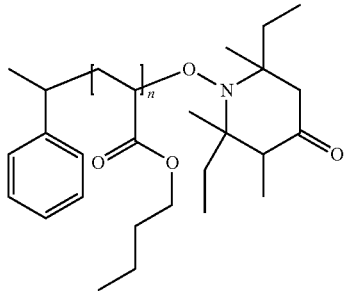

In a 2000 ml flask, 302.8 g of n-butylacrylate (nBA) and 15.0 g of NOR 1 were mixed. The mixture was stirred at room temperature and inerted for 1 h by a nitrogen stream. The temperature was increased from 25 to 115° C. and the reaction medium was reacted at 115° C. under a nitrogen atmosphere until the solid content reached 20%. Then, the internal temperature was increased from 115° C. to 125° C. and a dosage of further 605.6 g of n-butylacrylat was added during 120 minutes. The reaction medium was stirred under a nitrogen stream at 125° C. until the solid content reached the target value of 50%. Residual monomers and solvents were distilled off at 70° C. under vacuum (GPC: THF, PS-Standard, Mn=9,500 g/mol, PDI=1.20).

Example B1

Synthesis of a Block Copolymer
Poly(n-BA-b-DMAPMA-co-STY)

In a 500 ml flask equipped with a magnetic stirring bar and a distillation column 102 g of poly(n-BA) according to Example A and 44 g of dimethylaminopropyl methacrylamide (DMAPMA) and 4.5 g styrene were loaded. The mixture was heated under $N_2$ gas to 145° C. The reaction was terminated after 4.5 hours and non-reacted monomer DMAPMA was distilled off under vacuum. Finally, 127 g high viscous block copolymer was obtained (GPC: THF, PS-standard, Mn=10,500 g/mol, PDI=1.30).

Example B2

Synthesis of a Block Copolymer
Poly(n-BA-b-DMAEMA-co-STY)

In a 500 ml flask equipped with a magnetic stirring bar and distillation column 100 g of poly(n-BA) according to Example A and 50 g of 2-(dimethylamino)ethyl methacrylate (DMAEMA) and 5 g styrene were loaded. The mixture was heated under $N_2$ gas to 145° C. The reaction was terminated after 4 hours and non-reacted monomer DMAEMA was distilled off under vacuum. Finally, 133 g high viscous block copolymer was obtained (GPC: THF, PS-standard, Mn=11,000 g/mol, PDI=1.33).

Example 1

Synthesis of
poly(n-BA-co-MPEG500A-b-DMAPMA-co-STY)

Transesterification with MPEG500 40 wt %

In a 100 ml flask equipped with an overhead propeller stirrer and a distillation column with dry ice acetone cooling 60.0 g of poly(n-BA-b-DMAPMA-co-STY) according to Example B1 and 40 g of MPEG500 (Mn=500 g/mol) were added and dried by degasing at 80° C. for 60 min at 50 mbar. The clear reaction mass in the flask was heated to 135° C. Two portions of 100 mg of Lithium tert-butoxide were added during 5 hours at 130-135° C. The formed n-butanol was distilled off at reduced pressure (10 mbar). Finally, a brownish viscous liquid was obtained (GPC: THF, PS-standard, Mn=12,800 g/mol, PDI=1.55).

Example 2

Synthesis of
poly(n-BA-co-MPEG500A-b-DMAEMA-co-STY)

Transesterification with MPEG500 40 wt %

In a 100 ml flask equipped with an overhead propeller stirrer and a distillation column with dry ice acetone cooling 60 g of poly(n-BA-b-DMAEMA-co-STY) according to Example B2 and 40 g of MPEG500 (Mn=500 g/mol) were added and dried by degasing at 80° C. for 60 min at 50 mbar. The clear reaction mass in the flask was heated to 135° C. One portion of 1.3 g of titanium (IV) butoxide was added during 5 hours at 130-135° C. The formed n-butanol was distilled off at reduced pressure (10 mbar). Finally, a brownish viscous liquid was obtained (GPC: THF, PS-standard, Mn=12,500 g/mol, PDI=1.50).

Example 3

Synthesis of
poly(n-BA-co-MPEG500A-b-DMAEMA-co-STY)

Transesterification with MPEG500 55 wt %

In a 100 ml flask equipped with an overhead propeller stirrer and a distillation column with dry ice acetone cooling 45 g of poly(n-BA-b-DMAEMA-co-STY) according to Example B2 and 55 g of MPEG500 (Mn=500 g/mol) were added and dried by degasing at 80° C. for 60 min at 50 mbar. The clear reaction mass in the flask was heated to 135° C. One portion of 1.3 g of titanium (IV) butoxide was added during 5 hours at 130-135° C. The formed n-butanol was distilled off at reduced pressure (10 mbar). Finally, a brownish viscous liquid was obtained (GPC: THF, PS-standard, Mn=13,000 g/mol, PDI=1.52).

Example 4

Synthesis of
poly(n-BA-co-MPEG1000A-b-DMAEMA-co-STY)

Transesterification with MPEG1000 40 wt %

In a 100 ml flask equipped with an overhead propeller stirrer and a distillation column with dry ice acetone cooling 60 g of poly(n-BA-b-DMAEMA-co-STY) according to Example B2 and 40 g of MPEG1000 (Mn=1000 g/mol) were added and dried by degasing at 80° C. for 60 min at 50 mbar. The clear reaction mass in the flask was heated to 135° C. One portion of 1.3 g of titanium (IV) butoxide was added during 5 hours at 130-135° C. The formed n-butanol was distilled off at reduced pressure (10 mbar). Finally, a brownish viscous liquid was obtained (GPC: THF, PS-standard, Mn=13,000 g/mol, PDI=1.52).

Example 5

Quaternization with Ethylbromide (20% Quat.) of Block Copolymer Poly(n-BA-co-MPEG500A-b-DMAPMA-co-STY) According to Example 1

In a 100 ml flask equipped with an overhead propeller stirrer, 20 g of poly(n-BA-co-MPEG500A-b-DMAPMA-co-STY) according to Example 1 were dissolved in 30 g of water, and 0.31 g of ethylbromide (quaternization agent) was added at room temperature. The clear solution was stirred for 3 hours at 40° C. and further 3 hours at 60°, and subsequently cooked under vacuum (50 mbar) for 1 hour. Finally, a brownish viscous soil release polymer solution was obtained (40 wt % active) (GPC: THF, PS-standard, Mn=13,200 g/mol, PDI=1.56).

Examples 6 to 16

Quaternization of Block Copolymers According to Examples 2 to 4

In analogous way as described for the synthesis of poly (n-BA-co-MPEG500A-b-DMAPMA[quat*]-co-STY) (see Example 5), Examples 6 to 16 were prepared. The results and the reaction conditions are summarized in Table 1. Examples 6 to 8: Block copolymer of Example 2 quat. with ethylbromide 20%, 50% and 80%; Examples 9 and 10: Block copolymer of Examples 3 and 4 quat. with ethylbromide 20%; Examples 11 to 16: Block copolymer of Example 2 quat. with different quat. agents

B) Application Examples

Example 17

Testing of Soil Release Effect of the Block Copolymers of the Invention in Liquid Detergents Washing machine: Miele W 918 Novotronic®
Washing temperature: 20° C.
Liquor volume: 17 l
Water hardness: 16° dH (German hardness degree)
Ballast textiles: Clean laundry (Pillow, tricot, dish towels); 3.5 kg including the test textiles The laundry including the cotton and polyester test textiles was washed three times with a wash liquor comprising 75 ml of either detergent E1 or V1 (see composition in Table 2) according to the conditions given above. After the washing process, the laundry was air-dried.

TABLE 2

| Detergent composition [wt-%]: | V1 | E1 |
|---|---|---|
| $C_{12-14}$-fatty alcohol with 7 EO | 7 | 7 |
| $C_{12-18}$-fatty acid, Na-salt | 10 | 10 |
| Boric acid | 4 | 4 |
| Citric acid | 2 | 2 |
| Propanediol | 6 | 6 |
| NaOH | 3 | 3 |
| Protease | 0.6 | 0.6 |

TABLE 1

Quaternization of block copolymers according to Examples 2 to 4

| Examples | Block copolymer (Example/amount in g) | Quaternization agent (amount in g) | Conditions | Mn (g/mol) | PDI |
|---|---|---|---|---|---|
| 6 | Example 2 20 g | Ethylbromide 0.50 g | 3 h at 40° C., 3 h at 60° C., 1 h at 60° C. (50 mbar) | 13,100 | 1.56 |
| 7 | Example 2 20 g | Ethylbromide 1.25 g | 3 h at 40° C., 3 h at 60° C., 1 h at 60° C. (50 mbar) | 13,500 | 1.54 |
| 8 | Example 2 20 g | Ethylbromide 2.00 g | 3 h at 40° C., 3 h at 60° C., 1 h at 60° C. (50 mbar) | 13,800 | 1.57 |
| 9 | Example 3 20 g | Ethylbromide 0.38 g | 3 h at 40° C., 3 h at 60° C., 1 h at 60° C. (50 mbar) | 13,900 | 1.58 |
| 10 | Example 4 20 g | Ethylbromide 0.50 g | 3 h at 40° C., 3 h at 60° C., 1 h at 60° C. (50 mbar) | 14,100 | 1.58 |
| 11 | Example 2 20 g | Propyliodide 0.79 g | 3 h at 60° C., 3 h at 90° C., 1 h at 90° C. (50 mbar) | 13,500 | 1.57 |
| 12 | Example 2 20 g | 2-chlorobenzylchloride 0.81 g | 6 h at 60° C. | 14,200 | 1.60 |
| 13 | Example 2 20 g | Glycidol 0.34 g | 6 h at 70° C. | 13,800 | 1.58 |
| 14 | Example 2 20 g | p-toluenesulfonic acid monohydrate 0.79 g | 2 h at 70° C. | 13,100 | 1.52 |
| 15 | Example 2 20 g | 1,4-butane sultone 0.58 g | 6 h at 80° C. | 13,900 | 1.60 |
| 16 | Example 2 20 g | Diethyl sulfate 0.70 g | 6 h at 80° C. | 13,300 | 1.57 |

TABLE 2-continued

| Detergent composition [wt-%]: | | |
|---|---|---|
| | V1 | E1 |
| Amylase | 0.1 | 0.1 |
| Block copolymer of Examples 1 to 16 | — | 1.5 |
| H₂O | ad 100 | |

Subsequently, the test textiles were soiled with standardized fat/pigment stains (A: Make-up; B: Lipstick: C: sebum) and the stained test textiles were kept for 7 days at room temperature. The test textiles, together with the ballast textiles, were then washed with the wash liquors comprising the same detergent V1 or E1 (again in an amount of 75 ml) under the conditions given above. The CIE brightness Y of the test textiles was measured with a DATA-COLOR Spectra Flash SF500 remission spectrometer.

In Table 3 the performance results are shown (mean value of brightness Y of 6 washing procedures). A significant increase in Y of the stained test textiles was observed when using wash liquors comprising detergents with the block copolymers of the invention (E1). Thus, detergents comprising block copolymers of the invention (E1) have a significantly increased washing performance as compared to a detergent without such polymer (V1) as can be derived from Table 3.

TABLE 3

Performance results

| Detergent | Make-up on cotton | Lipstick on cotton | Sebum on cotton | Lipstick on polyester |
|---|---|---|---|---|
| V1 | 40.0 | 39.4 | 39.5 | 41.2 |
| E1-polymer 1 | 43.0 | 42.1 | 43.0 | 43.0 |
| E1-polymer 2 | 47.4 | 46.2 | 47.5 | 47.0 |
| E1-polymer 3 | 44.1 | 44.5 | 45.6 | 45.1 |
| E1-polymer 4 | 45.6 | 44.3 | 43.2 | 45.0 |
| E1-polymer 5 | 42.8 | 43.9 | 45.8 | 44.1 |
| E1-polymer 6 | 46.3 | 46.3 | 47.0 | 46.2 |
| E1-polymer 7 | 45.1 | 45.0 | 45.1 | 45.6 |
| E1-polymer 8 | 44.9 | 44.8 | 44.9 | 45.1 |
| E1-polymer 9 | 43.8 | 42.1 | 43.5 | 44.8 |
| E1-polymer 10 | 42.8 | 42.6 | 43.8 | 43.9 |
| E1-polymer 11 | 44.9 | 45.8 | 45.0 | 46.1 |
| E1-polymer 12 | 45.0 | 45.2 | 44.5 | 46.1 |
| E1-polymer 13 | 45.1 | 44.8 | 44.2 | 44.6 |
| E1-polymer 14 | 44.8 | 45.0 | 44.8 | 45.6 |
| E1-polymer 15 | 45.6 | 45.6 | 46.2 | 45.8 |
| E1-polymer 16 | 44.2 | 45.1 | 44.6 | 44.7 |

Example 18

Testing of Soil Release Effect of the Block Copolymers of the Invention in Powder Detergents Example 17 was repeated by substituting the detergents V1 and E1, respectively, by the powder detergents V2 and E2 (see composition in Table 4), which were used in amounts of 75 g per wash liquor.

TABLE 4

| Detergent composition [wt-%]: | | |
|---|---|---|
| | V2 | E2 |
| C₁₂₋₁₈-fatty alcohol with 7 EO | 2 | 2 |
| C₁₂₋₁₈-fatty alcohol sulfate with 7 EO, sodium salt | 1.5 | 1.5 |

TABLE 4-continued

| Detergent composition [wt-%]: | | |
|---|---|---|
| | V2 | E2 |
| Linear alkylbenzol sulfonate, sodium salt | 10 | 10 |
| Sodium carbonate | 20 | 20 |
| Sodium hydrogen carbonate | 6.5 | 6.5 |
| Sodium disilicate | 4 | 4 |
| Sodium percarbonate | 17 | 17 |
| TAED | 4 | 4 |
| Polyacrylates, sodium salt | 3 | 3 |
| carboxymethylcellulose | 1 | 1 |
| Sodium phosphoante | 1 | 1 |
| Sodium sulfate | 25 | 25 |
| Mix of enzymes | 1 | 1 |
| Block copolymer of Examples 1 to 16 | — | 1.5 |

In Table 5 the performance results are shown (mean value of brightness Y of 6 washing procedures). A significant increase in Y of the stained test textiles was observed when using wash liquors comprising detergents with the block copolymers of the invention (E2). Thus, detergents comprising block copolymers of the invention (E2) have a significantly increased washing performance as compared to a detergent without such polymer (V2) as can be derived from Table 5.

TABLE 5

Performance results of powder detergent (with selected polymers only)

| | Make-up on cotton | Lipstick on cotton | Sebum on cotton | Lipstick on polyester |
|---|---|---|---|---|
| V2 | 46.2 | 44.8 | 47.8 | 49.0 |
| E2-polymer 2 | 52.6 | 51.7 | 51.8 | 52.2 |
| E2-polymer 6 | 51.5 | 51.7 | 50.5 | 51.9 |
| E2-polymer 7 | 51.2 | 49.2 | 51.0 | 50.1 |
| E2-polymer 8 | 50.7 | 47.9 | 50.7 | 49.8 |
| E2-polymer 15 | 49.8 | 47.6 | 50.9 | 51.0 |

What is claimed is:

1. A block copolymer obtained by a process comprising:
   (a) polymerizing a $C_1$-$C_{10}$ alkyl ester of acrylic or methacrylic acid with controlled free radical polymerization;
   (b) polymerizing the polymer of (a) with controlled free radical polymerization with
      (i) one or more monomers according to the following formula (I):

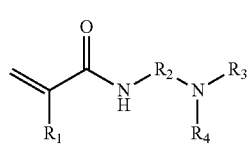

wherein $R_1$ is hydrogen or $C_{1-10}$ alkyl, $R_2$ is $C_{1-20}$ alkylene, and $R_3$ and $R_4$ are independently linear or branched $C_1$-$C_{22}$ alkyl; or (ii) one or more monomers according to the following formula (II):

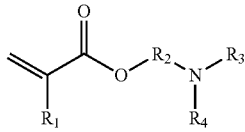 (II)

wherein $R_1$ is hydrogen or $C_{1-10}$ alkyl, $R_2$ is $C_{1-20}$ alkylene, and $R_3$ and $R_4$ are independently linear or branched $C_1$-$C_{22}$ alkyl; or (iii) a mixture of monomers according to formula (I) and (II); and (iv) optionally, with styrene or 4-Vinylpyridine, to form a block copolymer;

(c) modifying the block copolymer of (b) in a polymer analogous transesterification reaction with a primary or secondary alcohol; and (d) optionally, quaternizing of the block copolymer of (c);

wherein the block copolymer is effective as a soil release agent upon formulation of the block copolymer in a laundry detergent composition; and the block copolymer has a quaternization degree of 20 to 80%.

2. The block copolymer of claim 1, wherein the block copolymer has a polydispersity index PDI from 1.0 to 2.5.

3. The block copolymer of claim 1, wherein the block copolymer has been prepared in (a) from n-butylacrylate.

4. The block copolymer of claim 1, wherein the monomer of (b) is selected from the group consisting of dimethylaminopropyl methacrylate, dimethylaminopropyl acrylate, 2-(dimethylamino)ethyl methacrylate, 2-(dimethylamino)ethyl acrylate, dimethylaminopropyl acrylamide, dimethylaminopropyl methacrylamide, 2-(dimethylamino)ethyl acrylamide, and 2-(dimethylamino)ethyl methacrylamide.

5. The block copolymer of claim 1, wherein the monomer of (a) is n-butylacrylate and wherein the monomer of (b) is 2-(dimethylamino)ethyl methacrylate or dimethylaminopropyl methacrylamide.

6. The block copolymer of claim 1, wherein the primary or secondary alcohol in (c) is selected from the group consisting of:

(a) an ethoxylate of formula (A)

 (A)

wherein $R_A$ is saturated or unsaturated, linear or branched chain alkyl with 1 to 22 carbon atoms, or alkylaryl or dialkylaryl with up to 24 carbon atoms, and n is 1 to 150;

(b) a polydimethylsilicone oligomer of formula (B)

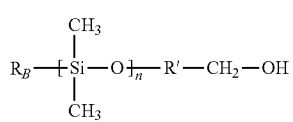 (B)

wherein $R_B$ is $C_1$-$C_{18}$ alkyl, phenyl or $C_7$-$C_{15}$ aralkyl; n is 1 to 50 and R' is a linking group with 1 to 20 carbon atoms;

(c) a partly or fully fluorinated primary alcohol; and (d) a $C_8$ to $C_{60}$ alkyl linear or branched primary or secondary alcohol.

7. The block copolymer of claim 6, wherein the primary or secondary alcohol is methoxy poly(ethylene glycol).

8. An aqueous laundry process comprising:

obtaining a laundry detergent composition comprising the block copolymer of claim 1 as a soil release agent and one or more detergent composition ingredients selected from the group consisting of: surfactants, builder substances, bleach components, brighteners, additives, enzymes, and dye-fixing agents; and washing laundry with the laundry detergent composition.

9. A detergent comprising: the block copolymer of claim 1 as a soil release agent and one or more detergent composition ingredients selected from the group consisting of: surfactants, builder substances, bleach components, brighteners, additives, enzymes, and dye-fixing agents.

10. A block copolymer obtained by a process comprising:

(a) polymerizing a MPEG acrylate, siloxane acrylate, siloxane methacrylate, fluorinated acrylate, fluorinated methacrylate, C16/C18 alkyl acrylate with controlled free radical polymerization;

(b) polymerizing the polymer of (a) with controlled free radical polymerization with (i) one or more monomers according to the following formula (I):

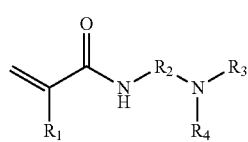 (I)

wherein $R_1$ is hydrogen or $C_{1-10}$ alkyl, $R_2$ is $C_{1-20}$ alkyl, and $R_3$ and $R_4$ are independently linear or branched $C_1$-$C_{22}$ alkyl; or (ii) one or more monomers according to the following formula (II):

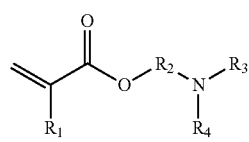 (II)

wherein $R_1$ is hydrogen or $C_{1-10}$ alkyl, $R_2$ is $C_{1-20}$ alkyl, and $R_3$ and $R_4$ are independently linear or branched $C_1$-$C_{22}$ alkyl; or (iii) a mixture of monomers according to formula (I) and (II); and (iv) optionally, with styrene or 4-vinylpyridine, to form a block copolymer; and (c) optionally, quaternizing of the block copolymer of (b);

wherein the block copolymer is effective as a soil release agent upon formulation of the block copolymer in a laundry detergent; and the block copolymer has a quaternization degree of 20 to 80%.

11. The block copolymer of claim 10, wherein styrene or 4-vinylpyridine are present in the range of from 0 to 20 repeating units.

12. An aqueous laundry process comprising:
obtaining a laundry detergent composition comprising the block copolymer of claim 10 as a soil release agent and one or more detergent composition ingredients selected from the group consisting of: surfactants, builder substances, bleach components, brighteners, additives, enzymes, and dye-fixing agents; and
washing laundry with the laundry detergent composition.

13. A detergent comprising: the block copolymer of claim 10 as a soil release agent and one or more detergent composition ingredients selected from the group consisting of: surfactants, builder substances, bleach components, brighteners, additives, enzymes, and dye-fixing agents.

14. A process for preparing a laundry detergent composition comprising:
a) polymerizing a $C_1$-$C_{10}$ alkyl ester of acrylic or methacrylic acid with controlled free radical polymerization;
b) polymerizing the polymer of (a) with controlled free radical polymerization with
    (i) one or more monomers according to the following formula (I):

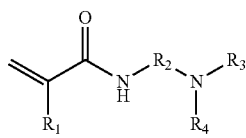

wherein $R_1$ is hydrogen or $C_{1-10}$ alkyl, $R_2$ is $C_{1-20}$ alkylene, and $R_3$ and $R_4$ are independently linear or branched $C_1$-$C_{22}$ alkyl; or
    (ii) one or more monomers according to the following formula (II):

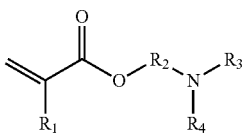

wherein $R_1$ is hydrogen or $C_{1-10}$ alkyl, $R_2$ is $C_{1-20}$ alkylene, and $R_3$ and $R_4$ are independently linear or branched $C_1$-$C_{22}$ alkyl; or
    (iii) a mixture of monomers according to formula (I) and (II); and
    (iv) optionally, with styrene or 4-vinylpyridine,
to form a block copolymer;
c) modifying the block copolymer of (b) in a polymer analogous transesterification reaction with a primary or secondary alcohol;
d) quaternizing of the block copolymer of (c) to a quaternization degree of 20 to 80%; and
e) mixing the block copolymer with one or more detergent composition ingredients selected from the group consisting of: surfactants, builder substances, bleach components, brighteners, additives, enzymes, and dye-fixing agents.

15. A process for preparing a laundry detergent composition comprising:
(a) polymerizing a MPEG acrylate, siloxane acrylate, siloxane methacrylate, fluorinated acrylate, fluorinated methacrylate, C16/C18 alkyl acrylate with controlled free radical polymerization;
(b) polymerizing the polymer of (a) with controlled free radical polymerization with
    (i) one or more monomers according to the following formula (I):

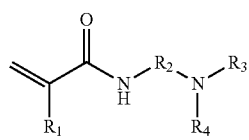

wherein $R_1$ is hydrogen or $C_{1-10}$ alkyl, $R_2$ is $C_{1-20}$ alkylene, and $R_3$ and $R_4$ are independently linear or branched $C_1$-$C_{22}$ alkyl; or
    (ii) one or more monomers according to the following formula (II):

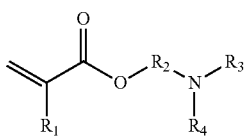

wherein $R_1$ is hydrogen or $C_{1-10}$ alkyl, $R_2$ is $C_{1-20}$ alkylene, and $R_3$ and $R_4$ are independently linear or branched $C_1$-$C_{22}$ alkyl; or
    (iii) a mixture of monomers according to formula (I) and (II); and
    (iv) optionally, with styrene or 4-vinylpyridine, to form a block copolymer;
(c) quaternizing of the block copolymer of (b) to a quaternization degree of 20 to 80%; and
(d) mixing the block copolymer with one or more detergent composition ingredients selected from the group consisting of: surfactants, builder substances, bleach components, brighteners, additives, enzymes, and dye-fixing agents.

* * * * *